(12) United States Patent
Smilovici et al.

(10) Patent No.: US 7,560,068 B2
(45) Date of Patent: Jul. 14, 2009

(54) METHOD AND APPARATUS FOR MANUFACTURING A CUTTING INSERT

(75) Inventors: Carol Smilovici, Nahariya (IL); Osama Atar, Yarka (IL); Assaf Ballas, Akko (IL); Basem Dakwar, Tarshiha (IL)

(73) Assignee: Iscar, Ltd. (IL)

( * ) Notice: Subject to any disclaimer, the term of this patent is extended or adjusted under 35 U.S.C. 154(b) by 392 days.

(21) Appl. No.: 11/321,917

(22) Filed: Dec. 29, 2005

(65) Prior Publication Data

US 2006/0165828 A1    Jul. 27, 2006

(30) Foreign Application Priority Data

Jan. 27, 2005    (IL) .................................. 166530

(51) Int. Cl.
  *B22F 3/087* (2006.01)
(52) U.S. Cl. .............. 419/66; 419/5; 419/10; 419/14; 419/18; 419/38; 425/352; 425/78
(58) Field of Classification Search .......... 419/66; 425/78
See application file for complete search history.

(56) References Cited

U.S. PATENT DOCUMENTS

| 5,075,053 | A | * | 12/1991 | Bernadic et al. | .............. | 419/14 |
| 2004/0035269 | A1 | | 2/2004 | Hecht | | |
| 2004/0086415 | A1 | | 5/2004 | Gubanich | | |
| 2004/0101374 | A1 | * | 5/2004 | Ejderklint | .................. | 407/114 |

FOREIGN PATENT DOCUMENTS

| FR | 2863187 | 6/2005 |
| JP | 55088945 | 7/1980 |
| JP | 10296499 | 11/1998 |
| JP | 2005177835 | 7/2005 |
| WO | WO 9408743 | 4/1994 |

OTHER PUBLICATIONS

Machine translation of JP 2005-177835.*
International Search Report, PCT/IL2006/000036, dated May 29, 2006.

* cited by examiner

*Primary Examiner*—Roy King
*Assistant Examiner*—Christopher S Kessler
(74) *Attorney, Agent, or Firm*—Womble Carlyle (57) ABSTRACT

A method for manufacturing a cutting insert green body having undercuts includes providing a die cavity formed in closed top and bottom dies; closing a bottom of the die cavity by a bottom punch accommodated in a punch tunnel formed in the bottom die; filling the die cavity with a pre-determined amount of sinterable powder; moving a top punch towards the die cavity through a punch tunnel formed in the top die; compacting the powder by urging the top and bottom punches towards each other, thereby forming the green body; and moving the top die and punch away from the bottom die and punch, thereby enabling removal of the formed green body. An apparatus for manufacturing a cutting insert green body having undercuts includes top and bottom dies which abut each other and top and bottom punches which slide in their respective dies.

12 Claims, 8 Drawing Sheets

METHOD AND APPARATUS FOR MANUFACTURING A CUTTING INSERT

FIELD OF THE INVENTION

The present invention relates to a method and apparatus for manufacturing pre-sintered cutting insert green bodies, to be subsequently sintered into cutting inserts.

BACKGROUND OF THE INVENTION

Fabrication of cutting inserts from sinterable powders, i.e., metallurgical, cermets or ceramics powders, comprises compaction of the sinterable powder, with or without a fugitive binder, into a pre-sintered green body, and subsequent sintering of the green body to produce a cutting insert. Compaction takes place under high pressures obtained through large opposing forces generated by top and bottom punches urged towards a die cavity formed in a die containing the sinterable powder, as is well known in the art. However, while parts having undercut elements may generally be pressed, the undercut elements inhibit release and subsequent extraction of the compacted green body from the die cavity.

SUMMARY OF THE INVENTION

In accordance with the present invention, there is preferably provided a method for manufacturing a cutting insert green body, the method comprising the steps of:

(i) Providing top and bottom dies and top and bottom punches associated therewith and slidably reciprocable relative thereto. Each die comprises opposing die abutment and die mounting faces and a die inner peripheral surface extending therebetween. Each die inner peripheral surface comprises an inner first peripheral surface extending from the die abutment face, an inner second peripheral surface extending from the inner first peripheral surface and converging inwardly to a die inner edge, and an inner third peripheral surface extending from the die inner edge to the die mounting face and forming a punch tunnel. Each punch comprises opposing punch pressing and punch mounting faces, with a punch peripheral surface extending therebetween and forming a punch edge at an intersection of the punch peripheral surface and the punch pressing face.

(ii) Positioning the top and bottom dies in a closed position, in which respective die abutment faces abut, and respective inner first and second peripheral surfaces form a die cavity. The bottom punch is located in the punch tunnel of the bottom die, and the top punch is external to the punch tunnel of the top die.

(iii) Filling the die cavity with a pre-determined amount of sinterable powder.

(iv) Moving the top punch into the punch tunnel of the top die.

(v) Compacting the sinterable powder by urging the punches through the respective punch tunnels towards each other to a compaction position. In the compaction position, the punch edge of the top punch and the die inner edge of the top die are contiguous, and the punch edge of the bottom punch and the die inner edge of the bottom die are contiguous, thereby forming the green body.

(vi) Moving the top die and punch away from the bottom die and punch to an open position, thereby enabling removal of the green body.

Preferably, the green body comprises opposing green body end faces and a peripheral side surface extending therebetween. The green body end faces are formed by the punch pressing faces. The green body peripheral surface is formed by the die inner first and second peripheral surfaces of the top and bottom dies.

Further preferably, the green body comprises top and bottom green body edges formed at intersections of the top and bottom green body end faces with the green body peripheral surface, respectively. Associated contiguous top and bottom punch edges and top and bottom die inner edges form top and bottom common die cavity edges, respectively. The top and bottom green body edges are formed at the top and bottom common die cavity edges.

Yet further preferably, the green body comprises a median plane M extending between the top and bottom green body end faces. In the compaction position, the abutting top and bottom die abutment faces coincide with the green body median plane M.

If desired, the green body peripheral surface comprises top and bottom green body relief surfaces adjacent the green body edges. Each green body relief surface forms a relief angle $\rho$ with the green body median plane M. The relief angle $\rho$ is obtuse at least a portion of each green body relief surface.

If further desired, the relief surfaces are formed by the inner second peripheral surfaces.

Typically, the green body end faces comprise rake surfaces adjacent the green body edges. Adjacent rake and relief surfaces form a wedge having a non-obtuse wedge angle $\omega$.

Generally, the wedge angle $\omega$ is acute at least along a portion of the wedge.

In accordance with another preferred embodiment, the green body may comprise a longitudinal through-hole extending between the green body end faces. The longitudinal through-hole is formed by a longitudinal rod extending between the punch pressing faces through the die cavity.

If desired, the longitudinal rod comprises slidably reciprocable top and bottom longitudinal pins disposed in top and bottom punch pin through-bores formed in the top and bottom punches.

Alternatively, the green body may comprise a lateral through-hole extending between two opposing green body major side surfaces of the green body peripheral surface. The lateral through-hole is formed by a lateral rod extending through the die cavity between opposing inner side portions of the inner first peripheral surfaces of the top and bottom dies.

Preferably, the lateral rod comprises opposing slidably reciprocable lateral pins disposed in top and bottom die pin channels of the top and bottom dies.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

Attention is drawn to FIGS. 1 to 4. A pre-sintered green body 20 is preferably formed by compaction of a sinterable powder consisting of metallurgical, ceramic or cermet powder, and a binder. The green body 20 is generally rectangular in an end view and has identical, opposing (i.e., facing in opposite directions) top and bottom green body end faces 22', 22". In the present description, when following a reference numeral, a single prime (') denotes a feature associated with the top side of the green body cutting insert, while a double prime (") denotes a feature associated with the bottom side of the green body cutting insert. Each green body end face 22', 22" has a 180° rotational symmetry about an axis of symmetry S which passes through the two green body end faces 22', 22". A peripheral green body side surface 24 extends between the two green body end faces 22', 22". The peripheral green body side surface 24 comprises two opposing, identical major side faces 24J of a general parallelogram shape; two opposing, identical minor side faces 24N, also generally parallelogram in shape; and four curved corner surfaces 24C. Each corner surface 24C extends between a major side face 24J and an adjacent minor side face 24N.

Major and minor green body axes J, N are defined as being perpendicular to each other and to the axis of symmetry S. The major axis J extends through the major side faces 24J and the minor axis N extends through the minor side faces 24N. Each major side face 24J has a 1800 rotational symmetry about the major axis J, and each minor side face 24N has a 180° rotational symmetry about the minor axis N. The major and minor axes J, N define a median plane M extending between the top and bottom green body end faces 22', 22".

Intersections of each green body end face 22', 22" and the peripheral green body side surface 24 define top and bottom green body edges 26', 26", respectively. Following sintering, the green body 20 becomes an indexable and reversible cutting insert and at least a portion of each of the top and bottom green body edges 26', 26" becomes a cutting edge.

Each green body edge 26', 26" comprises two major edges 26J', 26J" formed by the intersection of the major side faces 24J and each of the top and bottom end faces 22', 22"; two minor edges 26N', 26N" formed by the intersection of the minor side faces 24N and each of the top and bottom end faces 22', 22"; and four corner edges 26C', 26C" formed by the intersection of the corner surfaces 24C and each of the top and bottom end faces 22', 22".

The peripheral green body side surface 24 has top and bottom relief surfaces 28', 28" adjacent the top and bottom green body edges 26', 26", respectively. Each major side face 24J has two major relief surfaces 28J', 28J" adjacent the major edges 26J', 26J"; each minor side faces 24N has two minor relief surfaces 28N', 28N" adjacent the minor edges 26N', 26N"; and each corner surface 24C has two corner relief surfaces 28C', 28C" extending along the corner edges 26C', 26C". A central peripheral surface 30 extends between the top and bottom relief surfaces 28', 28". Each major side face 24J has a major central surfaces 30J extending between the top and bottom major relief surfaces 28J', 28J"; each minor side face 24N has a minor central surfaces 30N extending between the top and bottom minor relief surfaces 28N', 28N"; and each corner surface 24C has a corner central surface 30C extending between the top and bottom corner relief surfaces 28C', 28C". In a preferred embodiment, the green body median plane M intersects the central peripheral surface 30.

Each of the major relief surfaces 28J', 28J" forms a major relief angle ρJ with the green body median plane M. In accordance with the preferred embodiment, the major relief angles ρJ are obtuse, and therefor one of the top and bottom major relief surfaces 28J', 28J" constitutes an undercut element of the green body 20. It is understood that, similarly, the minor and corner relief surfaces 28N', 28N", 28C', 28C" form minor and corner relief angles with the green body median plane M.

Figure 1:
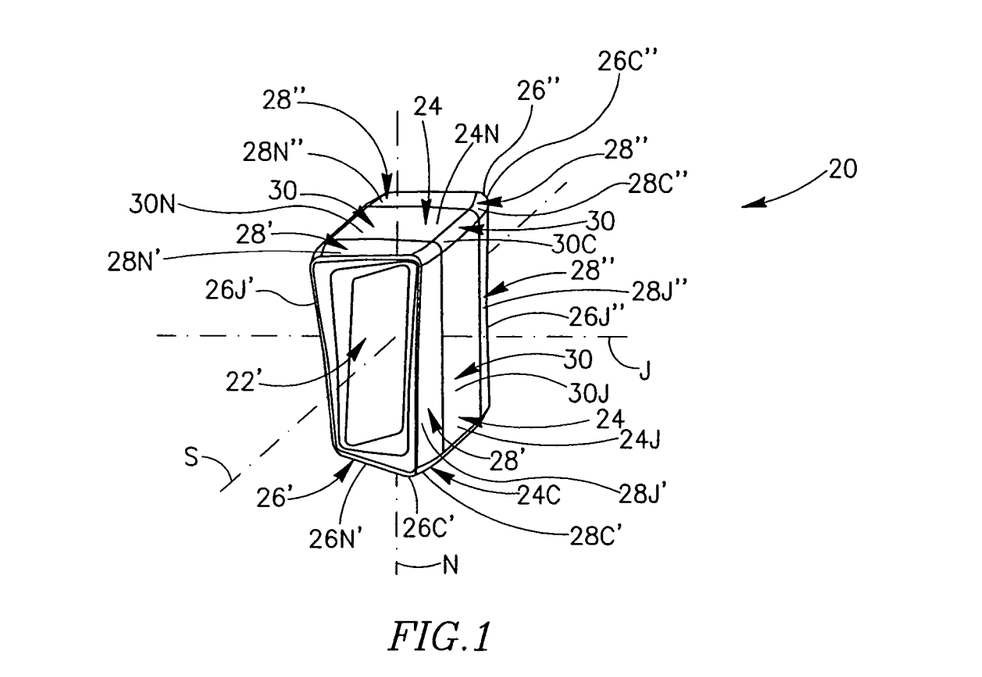
FIG. 1 is a perspective view of a green body manufactured in accordance with the method of the present invention.
Figure 2:
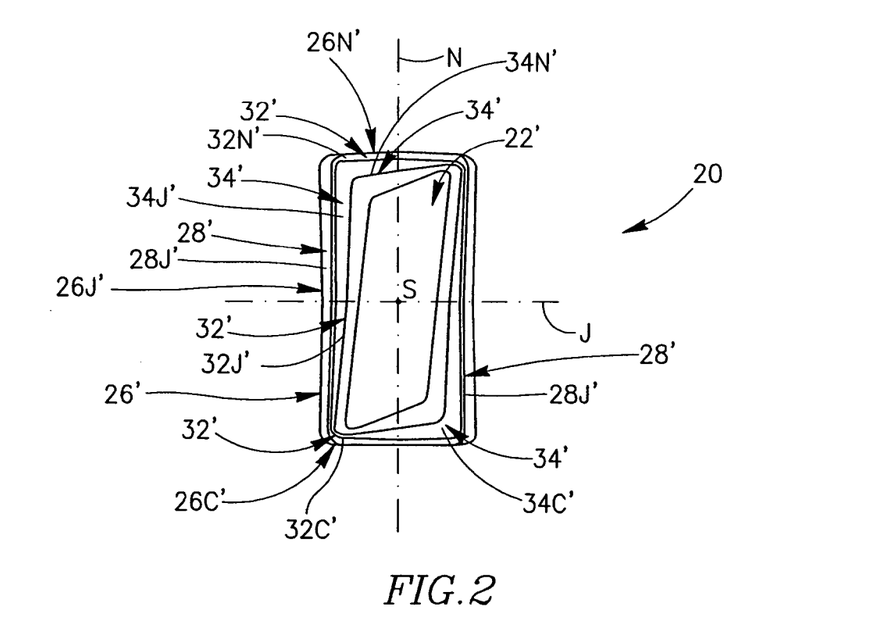
FIG. 2 is an end view of the green body shown in FIG. 1.
Figure 3:
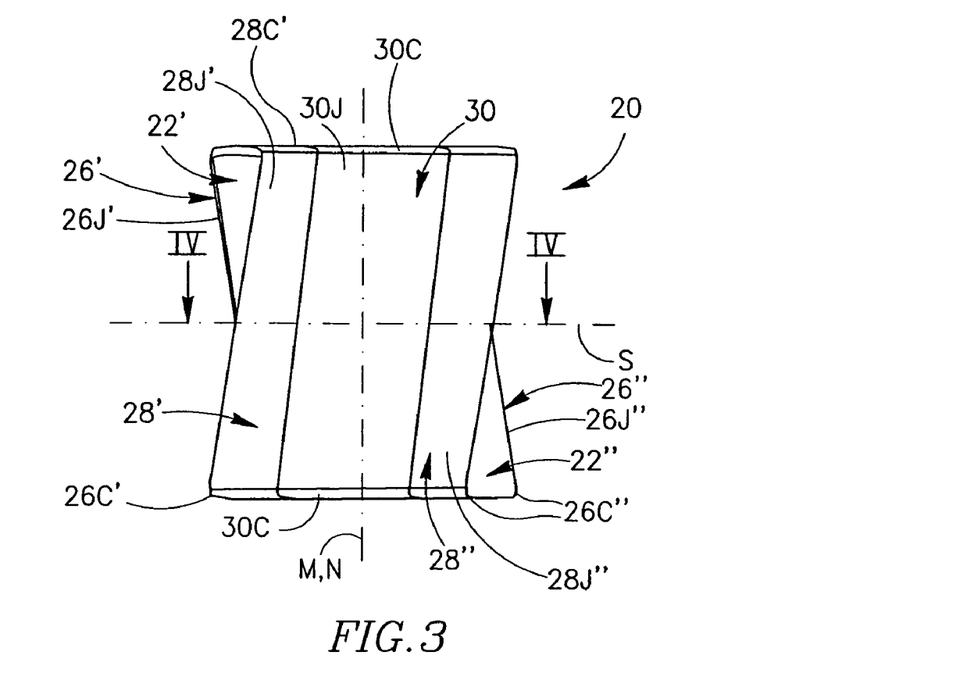
FIG. 3 is a major side view of the green body shown in FIG. 1

As best seen in FIG. 2, the green body top end face 22' has a top land 32' that extends parallel to, and inwardly from the top green body edge 26' towards the axis of symmetry S. The top land 32' comprises a pair of top major lands 32J' formed along the top major edges 26J', a pair of top minor lands 32N' formed along the top minor edges 26N' and four top corner lands 32C' formed along the top corner edges 26C'. A Top rake surface 34' extends inwardly from the top land 32' towards the axis of symmetry S while sloping towards the median plane M. The top rake surface 34' comprises a pair of top major rake surfaces 34J' adjacent the top major lands 32J', a pair of top minor rake surfaces 34N' adjacent the top minor lands 32N', and four top corner rake surfaces 34C' adjacent the top corner lands 32C'. It is understood that the green body top end face 22', and in particular its top rake surface 32', may comprise various geometries and features, such as chip breakers. It is further understood that the green body bottom end face 22" has a land and rake surface structure similar to that of the green body top end face 22'.

Figure 4:
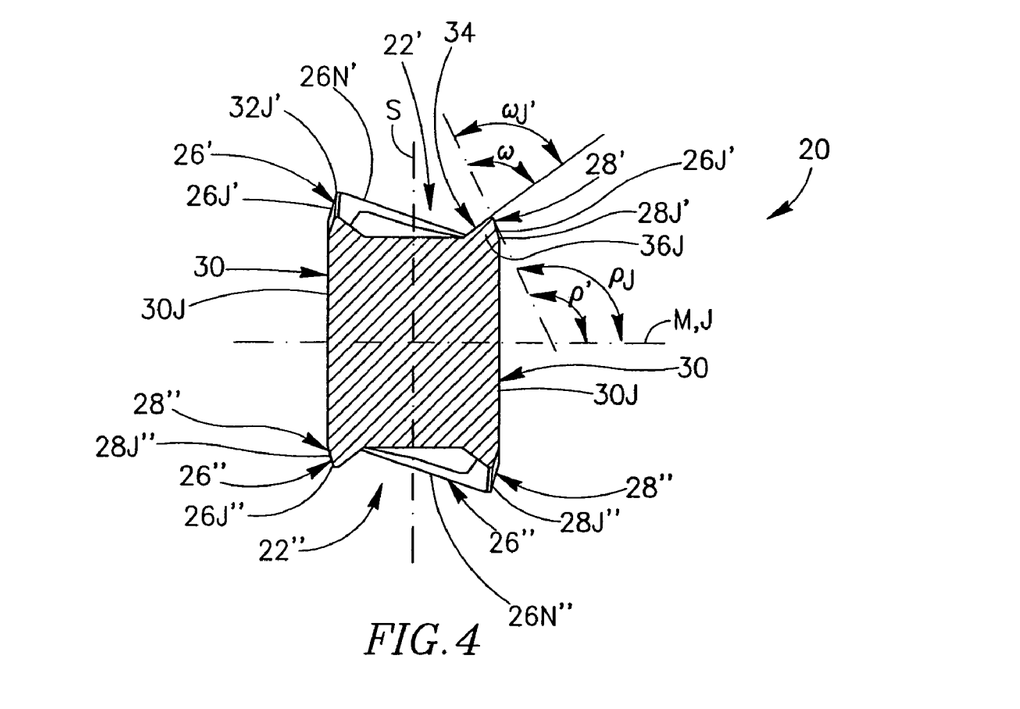
FIG. 4 is a cross-sectional view of the green body shown in FIG. 1, taken along the line IV-IV in FIG. 3.

As seen in FIG. 4, adjacent top major relief surface 28J' and top major rake surface 34J' form a top major wedge 36J' having a top major wedge angle ωJ'. It is understood that a top minor wedge having a top minor wedge angle is formed between adjacent top minor relief surface 28N' and top minor rake surface 34N' while a top corner wedge 36C' having a top corner wedge angle is formed between each adjacent top corner relief surface 28C' and top corner rake surface 34C'. In accordance with a preferred embodiment, the top major wedge angle ωJ', the top minor wedge angle and the top corner wedge angle are all acute. It is understood that the green body bottom end face 22 also has such wedges and wedge angles.

Figure 5:
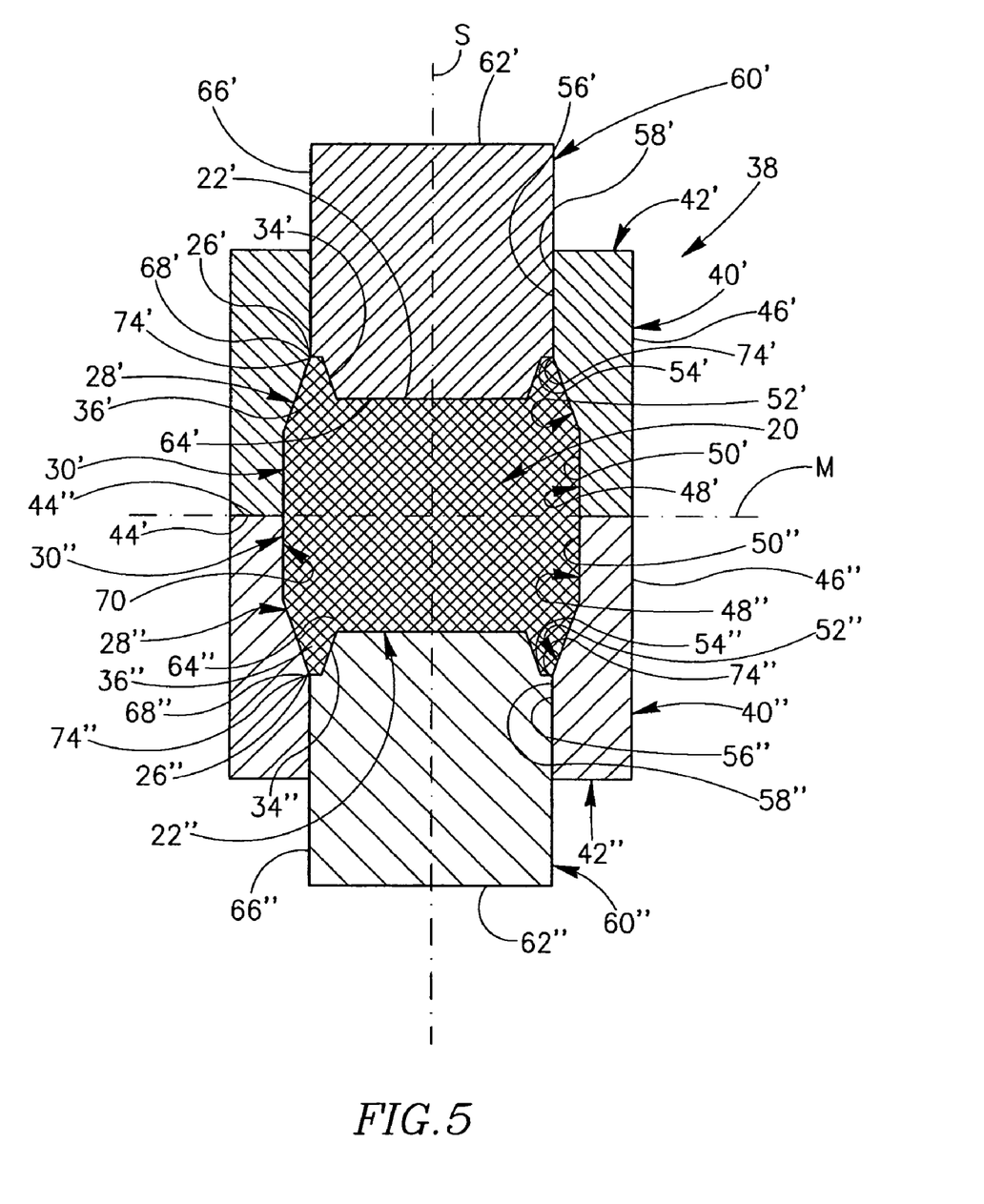
FIG. 5 is a schematic cross-section of a tool-set in accordance with the present invention, in a compaction position.
Figure 11:
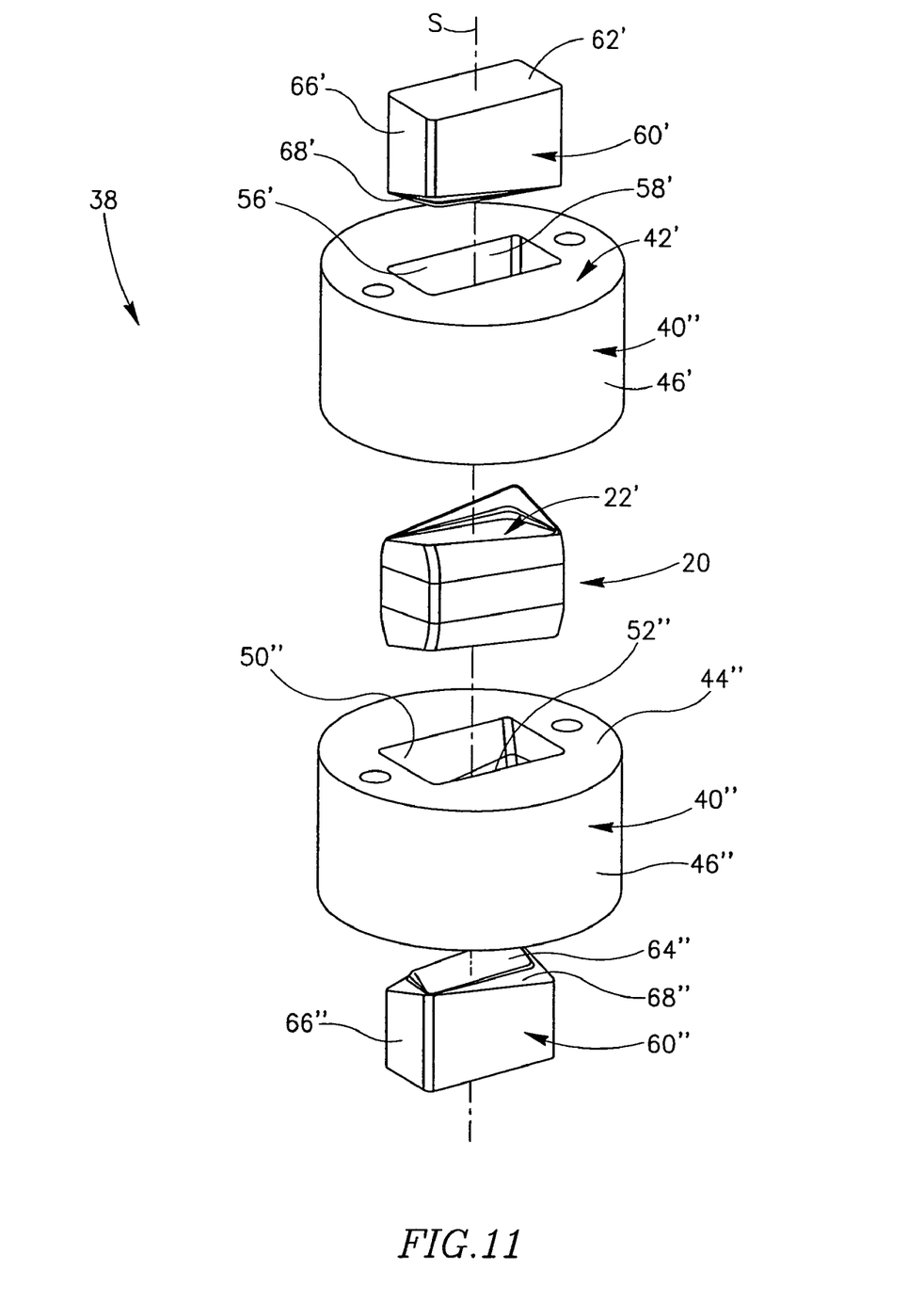
FIG. 11 is an exploded perspective view of the tool-set shown in FIG. 5.

Attention is now drawn to FIGS. 5 and 11. The green body 20 is compacted in a tool-set 38 having top and bottom dies 40', 40". Each die 40', 40" comprises a die mounting face 42', 42" used to attach the die 40', 40" to a press (not shown) opposing a die abutment face 44', 44" and die outer and inner peripheral surfaces 46', 46", 48', 48" extending therebetween. Each die inner peripheral surface 48', 48" comprises an inner first peripheral surface 50', 50" extending from, and transversely to, the die abutment face 44', 44"; an inner second peripheral surface 52', 52" extending from the inner first peripheral surface 50', 50" and converging inwardly to a die inner edge 54', 54"; and an inner third peripheral surface 56', 56" extending from the die inner edge 54', 54" to the die mounting face 42', 42". The inner third peripheral surface 56', 56" forms a punch tunnel 58', 58".

Top and bottom punches 60', 60" are associated with the top and bottom dies 40', 40", respectively, and adapted to be slidably reciprocable in relation thereto, through the respective punch tunnels 58', 58". Thus, each punch can slide in either direction within its punch tunnel. Each punch comprises a punch mounting face 62', 62", used to attach the punch to the press, opposing a punch pressing face 64', 64" and a punch peripheral surface 66', 66" extending therebetween, forming a punch edge 68', 68" at the intersection thereof with the punch pressing face 64', 64". Each die or punch 40', 40", 60', 60" is capable of independent reciprocating motion relative to each of the other top and bottom dies or punches 40', 40", 60', 60".

Figure 6:
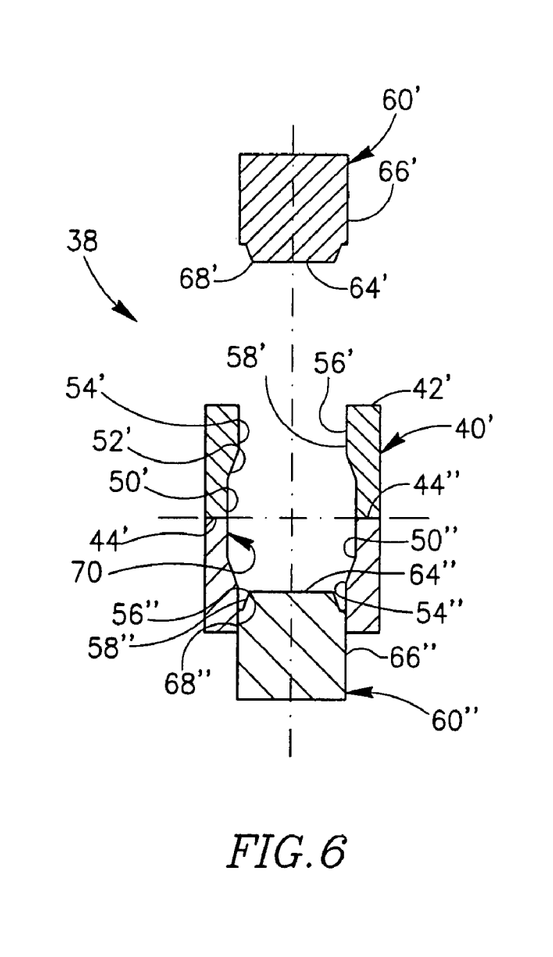
FIG. 6 is the schematic cross section of the tool-set shown in FIG. 5, in a closed position.
Figure 7:
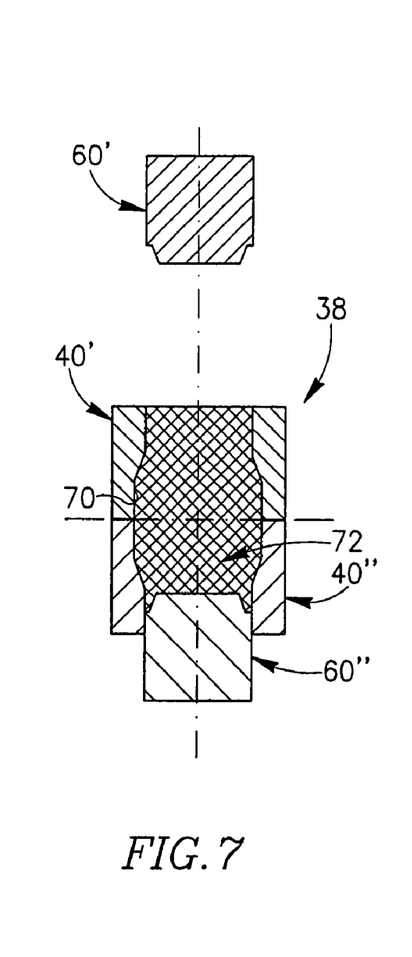
FIG. 7 is the schematic cross section of the tool-set shown in FIG. 5, in a filling position.
Figure 8:
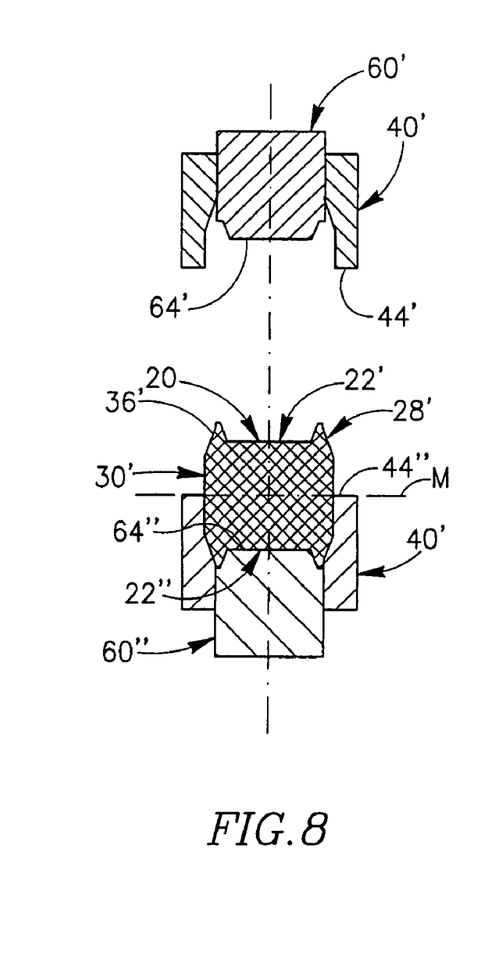
FIG. 8 is the schematic cross section of the tool-set shown in FIG. 5, in an open position.

Attention is additionally drawn to FIGS. 6 to 8. To manufacture the green body 20, the tool-set 38 is cycled through closing, filling, compaction and opening steps. In the closing step (FIG. 6), the tool-set 38 is brought to a closed position, in which the die abutment faces 44', 44" abut, and the first and second inner die peripheral surfaces 50', 50", 52', 52", form a die cavity 70 extending between the top and bottom die inner edges 54', 54". The bottom punch 60" is located in the punch tunnel 58" of the bottom die 40", with its punch edge 68" located below the die inner edge 54", while the top punch 60' is positioned outside the punch tunnel 58' of the top die 40'.

In the filling step (FIG. 7), the die cavity 70 is filled through the punch tunnel 58' of the top die 40' with a pre-determined amount of sinterable powder 72. Subsequent to filling the die cavity 70, the top punch 60' is lowered into the punch tunnel 58' of the top die 40', thereby sealing the sinterable powder 72 in the die cavity 70.

In the compaction step, the sinterable powder 72 is compacted to form the green body 20, as shown in FIG. 5, as the tool-set 38 is brought to a compaction position, by urging the top and bottom punches 60', 60" towards each other, until each punch edge 68', 68" and its associated die inner edge 54', 54" are contiguous, thereby forming top and bottom common die cavity edges 74', 74". In accordance with the preferred embodiment, during the compaction step, the green body end faces 22', 22" are formed by the punch pressing faces 64', 64". Each green body edge 26', 26" is formed at the common die cavity edges 74', 74". The green body relief surface 28', 28" are formed by the inner second peripheral surfaces 52', 52", and the green body top and bottom central surfaces 30', 30" are formed by the inner first peripheral surfaces 50', 50" of the top and bottom dies 40', 40", respectively, while the top and bottom die abutment faces 44', 44" coincide with the green body median plane M.

Due to the presence of the undercut elements of the green body, i.e. the top and bottom major relief surfaces 28J', 28J" having obtuse relief angles ρJ, and due to the matching geometry of the die inner second peripheral surfaces 52', 52", the green body 20 cannot be released from the die cavity 70 and extracted therefrom through the punch tunnel 58' of the top die 40'. In order to release the green body 20 and extract it from the tool-set 38, an opening step has to be performed, in which the tool-set is brought to an open position (see FIG. 8). To arrive at the open position, the top die 40' and the top punch 60' are moved up and away from the bottom die 40" and the bottom punch 60", opening the die cavity 70 and thereby exposing the green body 20, leaving it free to be removed from the bottom die 40".

The method of manufacturing a cutting insert green body has been illustrated above for a cutting insert having no through-hole. However, it will be apparent to a person skilled in the art that the above described method can easily be applied to manufacturing of cutting insert green bodies having through-holes formed therein.

Figure 9:
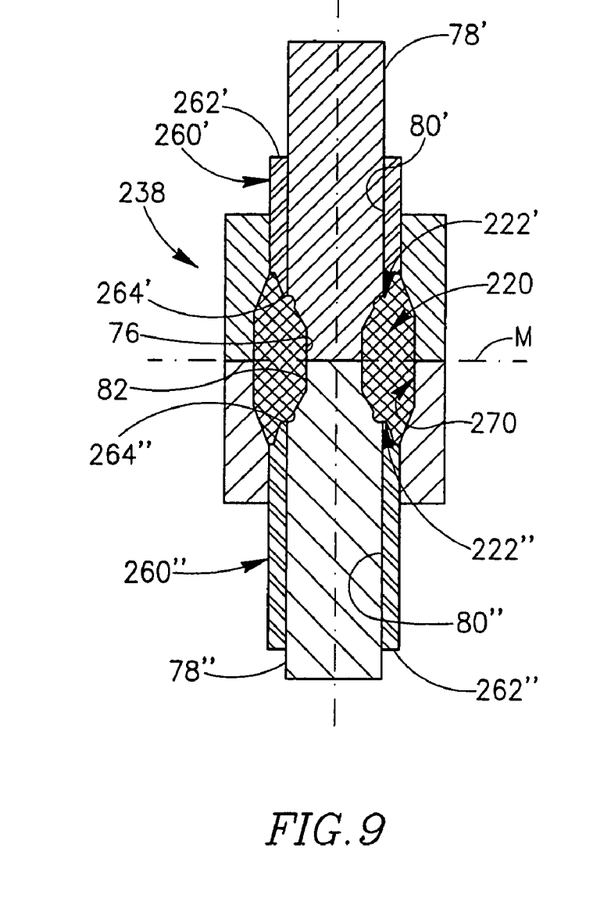
FIG. 9 is a schematic cross section of a longitudinal through-hole tool-set in the compaction position.
Figure 12:
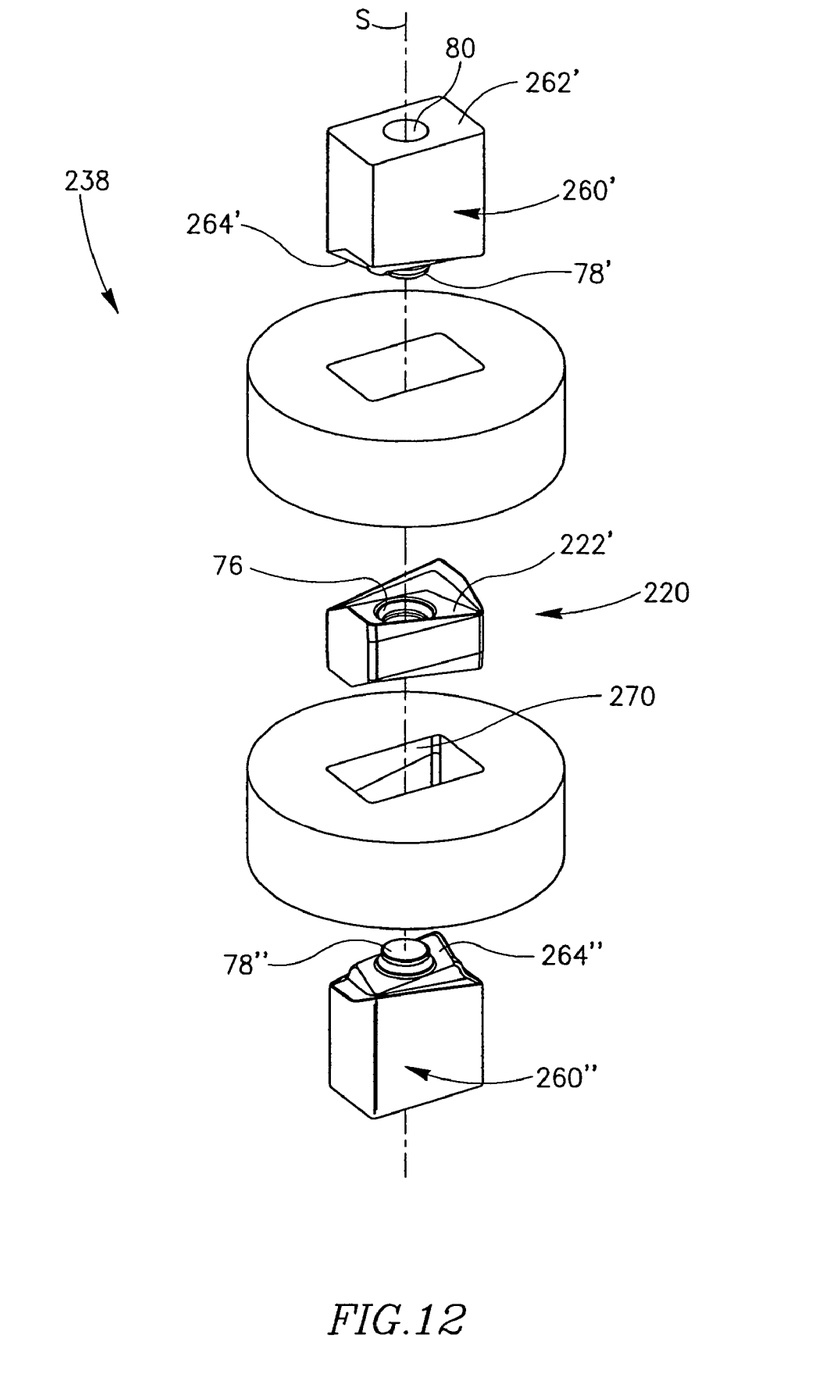
FIG. 12 is an exploded perspective view of the longitudinal through-hole tool-set shown in FIG. 9.

Attention is drawn to FIGS. 9 and 12. A longitudinal through-hole green body 220 is compacted by a longitudinal through-hole tool-set 238. Since the longitudinal through-hole green body 220 and the longitudinal through-hole tool-set 238 have many features which are similar to those of the green body 20 without a through-hole and its associated tool-set 38, similar features will be referred to herein below by reference numerals which are shifted by 200 from those of the green body 20 without a through-hole and the associated tool-set 38. The longitudinal through-hole green body 220 comprises a longitudinal through-hole 76 extending between the longitudinal through-hole green body top and bottom end faces 222', 222" perpendicularly to the green body median plane M. The longitudinal through-hole tool-set 238 comprises top and bottom longitudinal pins 78', 78" slidably disposed in punch pin through-bores 80', 80" extending through the punch mounting face 262', 262" and the punch pressing face 264', 264" of the respective top and bottom punches 260', 260". During compaction of the longitudinal through-hole green body 220, the longitudinal pins 78', 78" extend into the die cavity 270 and constitute a longitudinal rod 82 which extends between the top and bottom punch pressing faces 264', 264", to form the longitudinal through-hole 76 in the compacted longitudinal through-hole green body 220.

Figure 10:
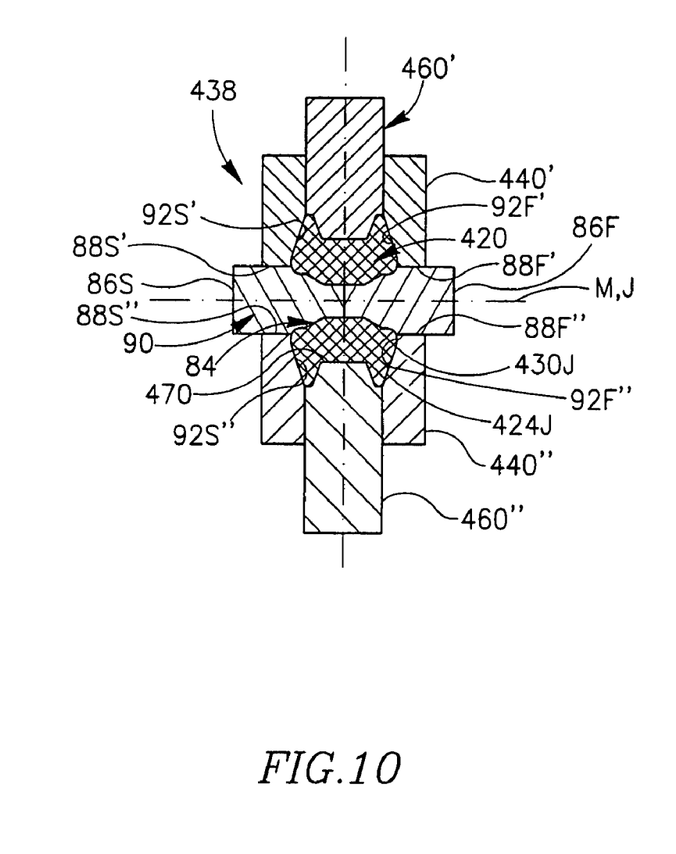
FIG. 10 is a schematic cross section of a lateral through-hole tool-set in the compaction position.
Figure 13:
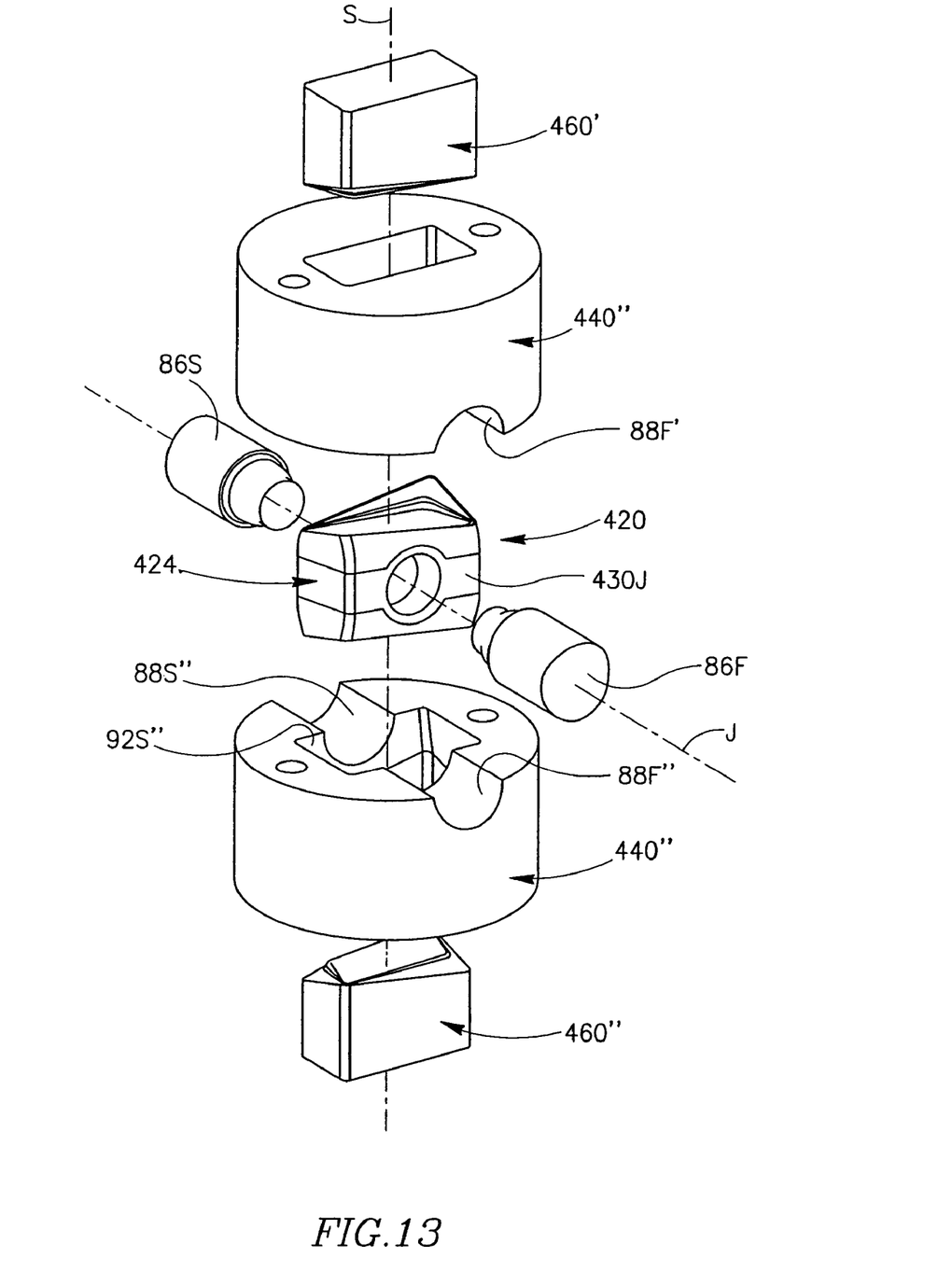
FIG. 13 is an exploded perspective view of the lateral through-hole tool-set shown in FIG. 10.

Attention is now drawn to FIGS. 10 and 13. A lateral through-hole green body 420 is compacted by a lateral through-hole tool-set 438. Since the lateral through-hole green body 420 and the lateral through-hole tool-set 438 have many features which are similar to those of the green body 20 without a through-hole and its associated tool-set 38, similar features will be referred to herein below by reference numerals which are shifted by 400 from those of the green body 20 without a through-hole and the associated tool-set 38. Thus, the tool-set 438 includes top and bottom dies 440', 440" and top and bottom punches 460', 460".

The lateral through-hole green body 420 comprises a lateral through-hole 84 extending between lateral through-hole green body major central surfaces 430J of opposing lateral through-hole green body major side faces 424J along the major axis J. The lateral through-hole tool-set 438 comprises first and second lateral pins 86F, 86S slidably disposed in first and second top and bottom die pin channels 88'F, 88'S, 88"F, 88"S. During compaction of the lateral through-hole green body 420, the first and second lateral pins 86F, 86S protrude into the die cavity 470 and abut each other to form a lateral rod 90. The lateral rod 90 extends through first and second top and bottom opposing portions 92'F, 92'S, 92"F, 92"S of the die inner first peripheral surface to form the lateral through-hole 84 of the lateral through-hole green body 420.

The above-described apparatus and method may facilitate pressing and subsequent ejection of green bodies having undercut elements. They also may allow for the formation of green bodies which have sharp, well-defined edges and acute wedge angles of the sort generally found desirable in cutting inserts manufactured from the green bodies. Finally, by eliminating acute re-entrant elements in its design, a tool set in accordance with the present invention may have adequate rigidity without suffering from increased risks of powder adhesion to the dies or punches and subsequent tear-off damage to the compacted green body.

Although the present invention has been described to a certain degree of particularity, it should be understood that alterations and modifications to the present invention may possibly be made without departing from the scope of the invention as hereinafter claimed.

What is claimed is:

1. A method for manufacturing a cutting insert green body comprising the steps of:
   (i) providing a cutting insert green body tool-set comprising top and bottom dies and top and bottom punches associated therewith, the top and bottom punches being slidably reciprocable relative to their associated top and bottom dies;
      each die comprising opposing die abutment and die mounting faces and a die inner peripheral surface extending therebetween, the die inner peripheral surface comprising an inner first peripheral surface extending from the die abutment face, an inner second peripheral surface extending from the inner first peripheral surface and converging inwardly to a die inner edge, and an inner third peripheral surface extending from the die inner edge to the die mounting face and forming a punch tunnel;
      each punch comprising opposing punch pressing and punch mounting ends, with a punch peripheral surface extending therebetween and forming a punch edge at an intersection of the punch peripheral surface and the punch pressing face;
   (ii) adjusting the cutting insert green body tool set to a closed position in which the die abutment faces of the top and bottom dies abut each other with the inner first and second peripheral surfaces of the top and bottom dies forming a die cavity, the bottom punch is located in the punch tunnel of the bottom die, and the top punch is external to the punch tunnel of the top die;
   (iii) filling the die cavity with a pre-determined amount of sinterable powder;
   (iv) moving the top punch into the punch tunnel of the top die;
   (v) compacting the sinterable powder by urging the punches through the respective punch tunnels towards each other to a compaction position, wherein the punch edge of the top punch and the die inner edge of the top die are contiguous, and the punch edge of the bottom punch and the die inner edge of the bottom die are contiguous, thereby forming the green body;
   (vi) moving the top die and punch away from the bottom die and punch to an open position, thereby enabling removal of the formed green body.

2. The method for manufacturing a cutting insert green body in accordance with claim 1, comprising forming opposing green body end faces on the green body, with the punch pressing faces during said compacting.

3. The method for manufacturing a cutting insert green body in accordance with claim 2, comprising forming a green body peripheral surface extending between the opposing green body end faces, with the die inner first and second peripheral surfaces during said compacting.

4. The method for manufacturing a cutting insert green body in accordance with claim 3, comprising:

forming top and bottom common die cavity edges from associated contiguous top and bottom punch edges and top and bottom die inner edges; and forming top and bottom green body edges of the green body at said top and bottom common die cavity edges during said compacting, said top and bottom green body edges being located on the green body at intersections of the green body peripheral surface with the green body top and bottom end faces, respectively.

5. The method for manufacturing a cutting insert green body in accordance with claim 4, wherein in the compaction position, the abutting top and bottom die abutment faces coincide with a green body median plane M which extends between the top and bottom green body end faces.

6. The method for manufacturing a cutting insert green body in accordance with claim 5, comprising forming green body relief surfaces, with the inner second peripheral surfaces during the compacting, each green body relief surface forming a relief angle $\rho$ with the green body median plane M, and the relief angle $\rho$ being obtuse at least along a portion of each green body relief surface.

7. The method for manufacturing a cutting insert green body in accordance with claim 6, comprising forming rake surfaces adjacent the green body edges on the green body end faces, wherein adjacent rake and relief surfaces form a wedge having a non-obtuse wedge angle $\omega$.

8. The method for manufacturing a cutting insert green body in accordance with claim 7, comprising forming an acute wedge angle $\omega$ at least along a portion of each wedge.

9. The method for manufacturing a cutting insert green body in accordance with claim 2, comprising forming a longitudinal through-hole extending between the green body end faces, the longitudinal through-hole being formed by a longitudinal rod extending between the top and bottom punch pressing faces through the die cavity.

10. The method for manufacturing a cutting insert green body in accordance with claim 9, comprising forming the longitudinal rod by inserting top and bottom longitudinal pins in top and bottom punch pin through-bores, respectively, and having said top and bottom longitudinal pins meet.

11. The method for manufacturing a cutting insert green body in accordance with claim 3, comprising forming a lateral through-hole extending between opposing portions of the green body peripheral surface, the lateral through-hole being formed by a lateral rod extending through the die cavity between opposing first and second inner side portions of the inner first peripheral surfaces of the top and bottom dies.

12. The method for manufacturing a cutting insert green body in accordance with claim 11, comprising forming the lateral rod by inserting first and second lateral pins into top and bottom die pin channels formed in the top and bottom dies, and having said first and second lateral pins meet.

* * * * *